United States Patent [19]

Morton et al.

[11] 3,914,671

[45] Oct. 21, 1975

[54] CONTROL MEANS FOR ELECTRIC MOTORS OPERATED FROM BATTERIES

[75] Inventors: John Morton, Hazel Grove; Keith Drummond Stevens, Marple; Graham Spencer Thexton, Marple Bridge, all of England

[73] Assignee: Cableform Limited, Romiley, England

[22] Filed: Apr. 1, 1974

[21] Appl. No.: 457,631

Related U.S. Application Data

[63] Continuation-in-part of Ser. No. 272,882, July 18, 1972, abandoned.

[30] Foreign Application Priority Data

| Sept. 23, 1969 | United Kingdom | 46727/69 |
| Feb. 6, 1970 | United Kingdom | 5741/70 |
| Feb. 7, 1970 | United Kingdom | 5990/70 |
| Feb. 14, 1970 | United Kingdom | 7188/70 |

[52] U.S. Cl. ............................ 318/139; 318/431
[51] Int. Cl.² .................................... H02P 05/06
[58] Field of Search .......... 318/139, 341, 434, 472, 318/39

[56] References Cited
UNITED STATES PATENTS

| 3,349,309 | 10/1967 | Dannettell | 318/341 |
| 3,551,774 | 12/1970 | Rusch | 318/341 |
| 3,569,807 | 3/1971 | Ulrich | 318/308 |
| 3,582,746 | 6/1971 | Nye | 318/381 |
| 3,809,975 | 5/1974 | Bartels | 318/39 |

*Primary Examiner*—Robert K. Schaefer
*Assistant Examiner*—John W. Redman
*Attorney, Agent, or Firm*—Holman & Stern

[57] ABSTRACT

In a control means for a battery operated motor such as is used in a fork lift truck, the D.C. switch for controlling the supply of current in pulses to the motor is controlled by a demand signal below a predetermined motor output but the demand signal is modified above that output to reduce the speed of the motor with increasing torque so as to prevent damage to the motor, the transmission and the control means whilst still maintaining a high rating.

10 Claims, 6 Drawing Figures

CONTROL MEANS FOR ELECTRIC MOTORS OPERATED FROM BATTERIES

This application is a continuation in-part application from U.S. Patent application Ser. No. 272,882, filed July 18, 1972, now abandoned.

This invention relates to control means for electric motors operated from batteries, such for example as are used in battery operated vehicles.

It is known to control the speed of an electric motor by controlling the supply of energy from a battery to a motor by means of a D.C. switch. Such switches usually comprise a thyristor switch arrangement which is switched on and off by a pulse generator having a markspace ratio of the pulses which is proportional to an input control signal, for example obtained from a speed control pedal of a vehicle driven by the motor.

For transmission systems of constant horsepower it is necessary for the speed of the motor to fall with increasing torque. The D.C. series motor has a characteristic which tends to satisfy this requirement while its field is unsaturated but very frequently such motors are used for considerable periods in the region above full load with the field saturated, as are also permanent magnet and fixed field shunt motors. This mis-use of a motor not only puts a strain on the motor but also strains the transmission so that either frequent failures occur or the transmission has to be designed to a higher rating than should be required with proper use. Such transmissions are thus heavier and more expensive.

Furthermore, thyristor manufacturers publish curves showing limits of duty cycle and mean current for a given thyristor case temperature. This is significant if the mean current is made up of pulses of high current and, consequently, high forward voltage drop, since the mean dissipation at low duty cycle is higher. In known arrangements the permissible steady state heat sink temperature is not constant but reduces as the duty cycle of the thyristor is increased. The control means therefore can be designed either to give 'worst case' protection by limiting the heat sink temperature to a low level resulting in unsatisfactory control means performance, or, by setting a higher temperature limit and relying on the transient performance of the thyristor to keep the thyristor temperature down until the heat sink temperature has caught up. This latter alternative has the disadvantage that transient dissipation becomes the criterion for choosing the thyristor with the result that a much larger thyristor is required than is necessary to satisfy steady state requirements.

An object of the present invention is to provide a control means to mitigate these disadvantages.

According to the invention, there is provided control apparatus for a battery-operated electric motor, said apparatus comprising in combination:

a D.C. motor, detecting means for detecting current and having an output, and a battery, all connected in series and in a closed circuit; D.C. switch means connected in series in said closed circuit for supplying pulsed direct current to the D.C. motor, said D.C. switch means being controllable by a demand signal supplied thereto;

amplifier means for comparing a reference signal corresponding to a predetermined motor current with a second signal corresponding to the output from said detecting means, said amplifier means generating an output only when said current detected by said detecting means is more than said predetermined motor current;

means for receiving said demand signal prior to supply to said D.C. switch means and said amplifier output and for controlling the demand signal supplied to said D.C. switch means so as to limit the output power of said motor whilst enabling the motor current to increase with reduction in speed of said motor.

Embodiments of the invention will now be described by way of example, with reference to the accompanying drawings in which.

Figure 2:
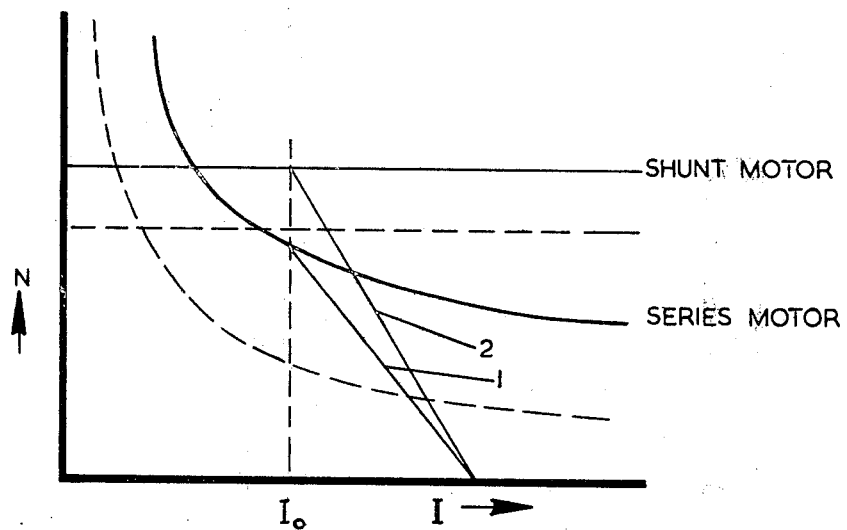
FIG. 2 is a graph illustrating the characteristics of series and shunt motors with and without the use of the invention.

Referring first to FIG. 2, the graph shows the speed N of series and shunt motors plotted against motor current I. The full lines both for series and shunt motors show the characteristics obtained with a full demand signal. Io represents the current at which maximum design horsepower is reached with a full demand signal and it can be seen that serious overload results if the current is increased further without a corresponding decrease in speed. In accordance with the invention, the motor characteristics are modified so that a predetermined decrease in speed is obtained with increasing current as at line 1 for a series motor and at line 2 for a shunt motor. The lines 1 and 2 represent a constant power limit.

Figure 1:
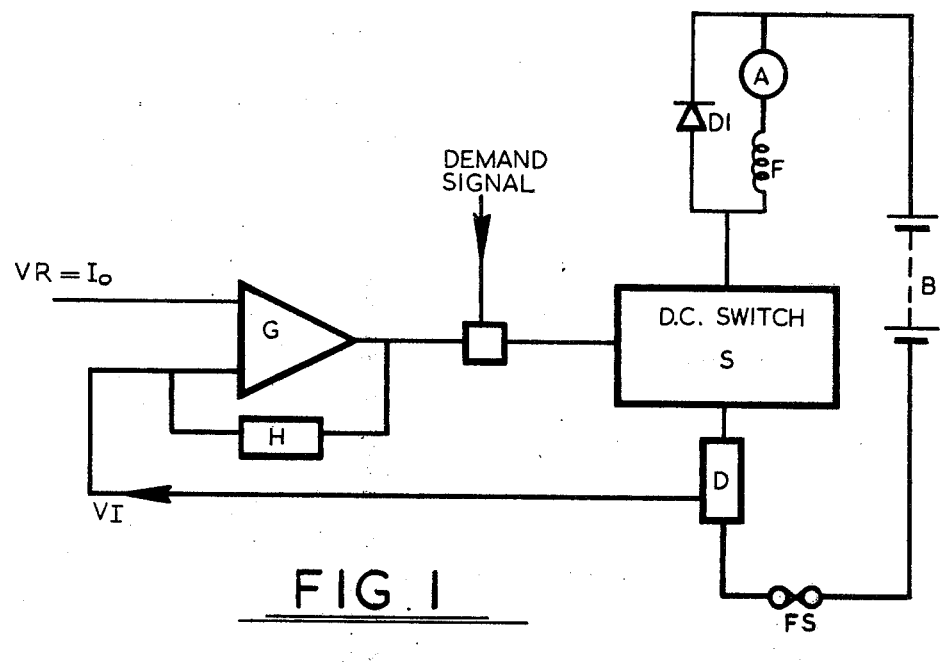
FIG. 1 is a schematic block diagram of a control means for a battery operated electric motor of a vehicle.

Referring to FIG. 1, there are shown a series motor (armature A, field F) connected to a battery B via a D.C. switch S. A current detector D is included in the motor circuit to obtain a signal VI proportional to peak motor current. The peak motor current occurs during the 'on' time of the D.C. switch and therefore peak current can be measured at any point in the battery, motor and D.C. switch circuit. Provided the pulse-repetition-frequency is high the ripple content of the motor current is low and the ratio of peak to mean current approaches unity. Diode D1 carries the motor current during the 'off' time.

The signal VI is fed to an amplifier G having as another input a threshold voltage VR corresponding to the current Io. Until the current signal VI indicates that the current exceeds Io as represented by the threshold signal VR there is no output from amplifier G and the D.C. switch is controlled entirely by the demand signal obtained, for example, from the speed control pedal of the vehicle. The voltage across the motor and therefore the speed of the motor is proportional to the demand signal. Thus to the left of current Io line (FIG.2) the motor characteristics are controlled only by variations in the demand signal. The characteristics for a reduced demand signal are shown in broken line.

To the right of the current Io line (i.e. VI > VR) the full demand signal is modified by the output from amplifier G to give a motor voltage which reduces with increasing current. The degree of voltage reduction is determined by the gain of amplifier G which is conveniently set by adjustment of the amount of feedback H. The reduced demand signal is unmodified to the left of line 1, and then follows the line 1 to the current axis.

Figure 3:
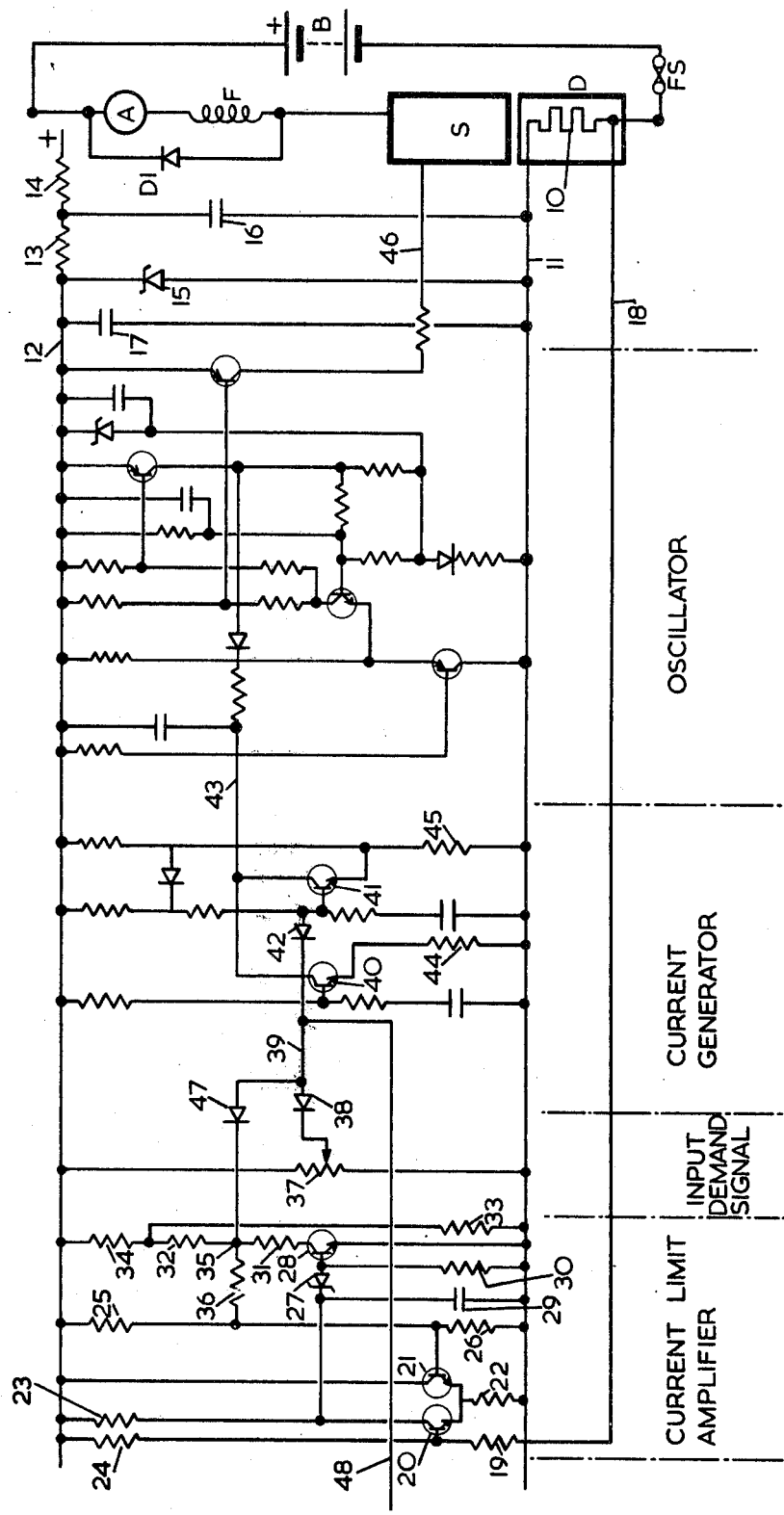
FIG. 3 is a circuit diagram of a control means for a battery operated electric motor of a vehicle.

An operational circuit diagram of a control means such as is illustrated in FIG. 1 will now be described with reference to FIG. 3. In FIG. 3, a motor comprising an armature A and a field winding F is shown connected across a battery B in series with a thyristor switch S, a detector D and a fuse FS. The motor is shunted by a free-wheeling diode D1.

The detector D comprises a resistor 10 adapted to carry a high current of for example 200 amps, and has a low resistance of for example 1 milliohm. The controlling circuit is supplied from a line 11 connected between the switch S and the resistor 10 and from a line 12 connected to the positive terminal of the battery B by an adjustable resistor (not shown) which permits the circuit to be fitted to batteries of a variety of voltages. The supply is smoothed and protected against short circuits in known manner by resistors 13 and 14, a zener diode 15 and capacitors 16 and 17.

The signal VI referred to in the description of FIG. 1 is obtained on a line 18 connected between the battery B and the resistor 10. The line 18 is connected via a resistor 19 to the base of a transistor 20 of a balanced pair of transistors 20, 21. The transistors 20, 21, are mounted in one case so that their characteristics are maintained the same even when they are subjected to temperature changes. The emitters of transistors 20 and 21 are joined and connected by a resistor 22 to the line 11, their collectors are connected to the line 12 by a resistor 23 and directly respectively, and their bases are connected by resistors 24 and 25 respectively to the line 12. The base of transistor 21 is also connected to the line 11 by a resistor 26.

The bias on transistors 20 and 21 is such that transistor 20 conducts when no current passes through the resistor 10, that is when the switch S is off. When current passes through resistor 10, a voltage difference proportional to the current appears between lines 11 and 18. If this voltage difference is sufficient to reverse bias the base/emitter junction of the transistor 20 it turns off. The voltage difference required to turn off transistor 20 is dependent upon the voltage provided by resistors 25 and 26 to the base of transistor 21, as the greater the forward bias on the base/emitter junction of transistor 21 the more positive is the voltage applied to the emitter of transistor 20. The voltage applied to the base of transistor 21 this corresponds to the threshold voltage VR referred to in connection with FIG. 1.

When the transistor 20 begins to turn off, the voltage at its collector rises, and this collector voltage is applied to a zener diode 27 connected to the base of a transistor 28. The diode 27 provides a D.C. voltage shift. A capacitor 29 smooths voltage changes applied to the diode 27 and a resistor 30 prevents the diode "trapping" charge on the base of transistor 28.

The emitter of the transistor 28 is connected directly to the line 11, and its collector is connected by resistors 31, 32 and 33 to the line 11 and by resistors 31, 32 and 34 to the line 12. The bias applied to the transistor 28 is such that it begins to conduct as soon as a voltage is passed to it by the diode 27, resulting in the voltage at the junction 35 of resistors 31 and 32 becoming more negative. A feedback loop corresponding to feedback H of FIG. 1 is provided by a resistor 36 connected to the base of transistor 21. The circuit components described so far form an amplifier the gain of which is controlled by the feedback loop in conventional manner. The voltage at junction 35 is proportional to the voltage across resistor 10, and hence to the current therethrough.

The input demand signal referred to in FIG. 1 is provided by a potentiometer 37 which is controlled via a foot-pedal or lever by the vehicle operator. This demand signal is applied to a diode 38 connected to a line 39 which in turn is connected to the base of transistor 40 directly and a transistor 41 via a diode 42. The transistors 40 and 41 and their associated supply network act as a current generator the output of which is provided on a line 43. The emitters of transistors 40 and 41 are connected via resistors 44 and 45 respectively to line 11.

The transistors 40 and 41 are biased so that one begins to conduct before the other. This means that the response to changes in the demand signal is less for a lower range of demand signals, which enables a sensitive low-speed control to be obtained with a linear potentiometer 37.

The current output on line 43 is used to control an oscillator of conventional design which will not be described in detail. This oscillator is arranged to provide a pulsed output on line 46 the mark-to-space ratio of which is proportional to the generated current on line 43. This pulsed signal is used to trigger the thyristor of the switch S.

It will be appreciated that the greater the difference between the voltages on the lines 39 and 11, the greater will be the current provided by the transistors 40 and 41, and hence the greater the mark-to-space ratio of the pulses triggering the switch S.

The terminal 35 of the current limit amplifier is connected to the line 39 by a diode 47. The pair of diodes 38 and 47 thus automatically apply to the line 39 the lowest of the voltages provided by terminal 35 and potentiometer 37. Once the voltage across resistor 10 is sufficient for the transistor 28 to be rendered conductive, a demand signal from the potentiometer 37 will be isolated from the line 39 if it is more positive than the voltage at terminal 35.

A drive clamp line 48 is connected to the line 39 which may when desired be connected to the line 11 for example by a transistor switch (not shown), effectively shutting off the current generator and preventing operation of the vehicle.

The described circuit is such that when a predetermined motor current is exceeded, the motor may still be controlled by the demand signal in its unmodified form providing the demand signal voltage is more negative than the voltage at terminal 35. As the motor current increases, the range of demand signal voltages which will control the motor decreases, but demand signals within that range will be effective as if no current limit system were provided. This contrasts with certain known systems in which the demand signal is modified whenever a predetermined motor current is exceeded.

Figure 4:
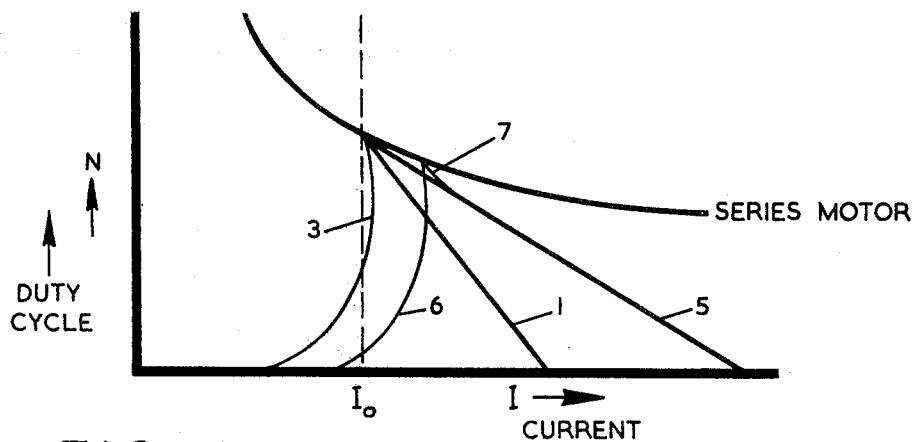
FIG. 4 is a graph incorporating the series motor curves of FIG. 2 and showing additional characteristics.

Referring now to FIG. 4, the series motor characteristic and modified characteristic 1 of FIG. 2 are shown in a graph together with curves showing amongst others the battery current characteristic 3.

It will be seen that the battery current and motor current follow the same characteristic to the left of the point Io where the switch is controlled by the full demand signal, but once the demand signal is modified to cause a reduction in speed with increasing torque the battery current follows the curve 3 whereas the motor current continues along curve 1. The short-circuit current builds up along curve 5. The rating of the fuse FS in the battery circuit can therefore be considerably less than the maximum motor current enabling a much faster rupturing time in short-circuit conditions than in prior art arrangements in which the motor current and the battery current generally have the same maximum value.

The battery is usually arranged in a block but this has the disadvantage that if a double earth fault occurs, i.e. two separate cells break down to earth, a high circulating current from the shorted section of the battery occurs in the battery housing or surrounding part of the vehicle with the result that high temperatures occur leading to a fire and a damaged vehicle. This is a serious disadvantage for train traction units used in mines and other hazardous locations and it has been suggested that batteries for such units should be made up in small blocks of, say, 10 volts and the small blocks insulatingly mounted from each other so that the double earth fault would have to occur in a single small block before circulating current in the housing occurs and such current would be limited to the capability of the small block. However such a battery construction is expensive and is wasteful of space.

As already explained a fuse included in the battery circuit can have a rating of less than the maximum motor current.

In accordance with the invention at least one interconnection between two adjacent cells includes a fuse having a rating of less than the maximum motor current.

Conveniently, a fuse is included between adjacent cells at, say, every fifth cell or at any other number of cells as is deemed necessary. In the limiting case a fuse is provided in the interconnection between every adjacent cell.

Figure 5:
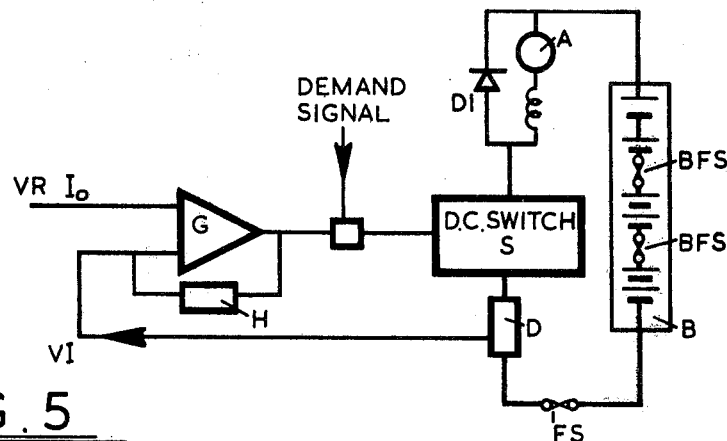
FIG. 5 is a schematic block diagram similar to that of FIG. 1 but including inter-cell fuses in the battery.

FIG. 5 is a schematic diagram of an embodiment of the invention for use, for example, in a mine train electric traction unit.

The general operation of the control means shown in FIG. 5 is described in relation to FIG. 1. A fuse outside the battery is shown at FS and fuses BFS are shown between groups of cells in battery B. All of the fuses are rated below the maximum motor current but it is convenient to rate the fuses BFS slightly higher than that of fuse FS so that when a fuse blows for a reason external to the battery then preferentially fuse FS is the one which blows.

However, where the fault is within the battery the appropriate fuse BFS blows. As already mentioned, the fuses have a rating less than the maximum motor current and thus the maximum circulating current occurring when a battery breaks down to earth is limited to less than the maximum motor current, thereby providing a substantial reduction in a risk of fires and other damage.

Referring again to FIG. 4, curve 6 shows the curve of mean current against duty cycle for constant thyristor case temperature in accordance with thyristor manufactures recommendations. This curve can be expanded into a curve of motor current against duty cycle and is shown at 7. If the current limit line 1 of the control means is chosen as shown so that curve 3 of mean battery current is to the left of curve 6 then it is possible to protect the thyristor at all times by imposing a limit on the case temperature.

In accordance with the invention, the control of the motor is varied in accordance with a signal derived from a temperature sensing element which senses the temperature of the thyristor casing or any other part to be protected so that the motor output is cut-back when the temperature rises.

Conveniently the temperature sensing element is a thermistor of which one or more may be mounted, for example on the heat sink of the thyristors and/or the drive motor.

Figure 6:
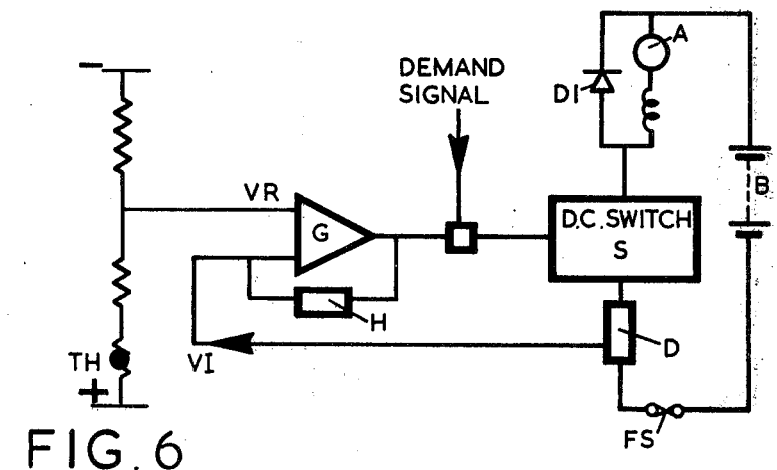
FIG. 6 is a schematic block diagram similar to that of FIG. 1 but including a thermistor for temperature control.

Referring to FIG. 6, there is shown a series motor (armature A, field F) connected to a battery B via a D.C. switch S. A current detector D is included in the motor circuit to obtain a signal VI proportional to peak motor current. The general operation of the arrangement is similar to that described with reference to FIG. 1.

In the arrangement of FIG. 6 however, the threshold signal VR is varied in accordance with the temperature of the part or parts to be protected. A PTC thermistor TH situated, for example, at the heat sink of the thyristors or at the drive motor or other part to be protected, is included in a potentiometer circuit which sets the threshold signal VR. If the temperature rises above a predetermined level the resultant increase in the resistance of thermistor TH becomes significant to vary the threshold signal in a direction to cause the demand signal to be modified at a low power output threshold thus reducing the current that can be obtained from the switch S. By this means excessive build-up of temperature is avoided.

If desired, a plurality of temperature sensing elements may be disposed about the apparatus and combined together in a suitable circuit to provide a desired control of the threshold signal VR.

In an alternative arrangement (not shown) the reference input VR of amplifier G remains constant and the output of amplifier G is taken to an additional stage including the thermistor which varies the amplifier output in accordance with the temperature.

In a further alternative arrangement, a thermistor may be connected so as to modify the mark-to-space ratio of the signal applied to the switch S for any particular demand signal whether modified or not by the amplifier G. For example, in the circuit of FIG. 3 a thermistor could be mounted on the thyristor and connected in place of the resistor 51 so that an increase in the temperature of the thermistor would reduce the current generated by the transistor 47.

With the present invention, the reliability of the vehicle is not dependent upon the skill of the drive in sensing overload conditions of his vehicle. Irrespective of the demands of the driver the motor and transmission of the vehicle are maintained within predetermined maximum load conditions.

A further advantage of the system in accordance with the invention is that for high motor currents the duty cycle of the D.C. switch is low and that of the diode is high, thus allowing a more economical controller.

What is claimed is:

1. Control apparatus for a battery-operated electric motor, said apparatus comprising in combination:

a D.C. motor, detecting means for detecting current and having an output, and a battery, all connected in series and in a closed circuit; D.C. switch means connected in series in said closed circuit for supplying pulsed direct current to the D.C. motor, said D.C. switch means being controllable by a demand signal supplied thereto;

amplifier means for comparing a reference signal corresponding to a predetermined motor current with a second signal corresponding to the output from said detecting means, said amplifier means generating an output only when said current detected by said detecting means is more than said predetermined motor current;

means for receiving said demand signal prior to supply to said D.C. switch means and said amplifier output and for controlling the demand signal supplied to said D.C. switch means so as to limit the output power of said motor whilst enabling the motor current to increase with reduction in speed of said motor.

2. A control apparatus as claimed in claim 1 wherein said amplifier output is indicative of the maximum demand signal permitted at the detected motor current, and said receiving means prevents the demand signal supplied to the D.C. switch means exceeding the said maximum demand signal.

3. A control means as claimed in claim 1, wherein the receiving means comprises a pair of diodes in parallel connected respectively to receive the said amplifier output and the said demand signal, the polarity of the diodes being such that the signal representative of the greater demand is trapped as a result of its respective diode being reverse-biased by the other signal.

4. Control means as claimed in claim 1 wherein the demand signal supplied to the D.C. switch means is varied in accordance with a signal derived from a temperature sensing element which senses the temperature of a part to be protected against excessive temperature rise so that the output power limit is cut-back when the temperature rises above a predetermined value.

5. Control means as claimed in claim 1, wherein the gain of the amplifier means is adjustable.

6. Control means as claimed in claim 1 wherein the D.C. switch comprises thyristors controlled by a pulse generator.

7. Control means as claimed in claim 4, wherein the D.C. switch comprises thyristors and the temperature sensing element is a thermistor mounted on the heat sink of the thyristors.

8. Control means as claimed in claim 4, in which a plurality of temperature sensing elements are disposed about the control means and the apparatus controlled thereby and combined together in a circuit to vary the output power limit.

9. Control means as claimed in claim 1, wherein a fuse is provided in the battery circuit having a rating of less than the maximum motor current.

10. Control means as claimed in claim 9, wherein at least one interconnection between two adjacent cells of the battery includes a fuse having a rating of less than the maximum motor current.

* * * * *